(12) United States Patent
Büttner et al.

(10) Patent No.: US 9,787,164 B2
(45) Date of Patent: Oct. 10, 2017

(54) ELECTRICAL MACHINE HAVING A ROTOR FOR COOLING THE ELECTRICAL MACHINE

(71) Applicant: Siemens Aktiengesellschaft, München (DE)

(72) Inventors: Klaus Büttner, Hollstadt (DE); Klaus Kirchner, Ostheim (DE); Matthias Warmuth, Windshausen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 390 days.

(21) Appl. No.: 14/383,295

(22) PCT Filed: Mar. 6, 2013

(86) PCT No.: PCT/EP2013/054492
§ 371 (c)(1),
(2) Date: Sep. 5, 2014

(87) PCT Pub. No.: WO2013/131949
PCT Pub. Date: Sep. 12, 2013

(65) Prior Publication Data
US 2015/0042185 A1    Feb. 12, 2015

(30) Foreign Application Priority Data

Mar. 8, 2012 (DE) .................. 10 2012 203 697

(51) Int. Cl.
*H02K 9/19* (2006.01)
*H02K 9/197* (2006.01)
(Continued)

(52) U.S. Cl.
CPC ............ *H02K 9/197* (2013.01); *B60L 3/0061* (2013.01); *B60L 3/0069* (2013.01);
(Continued)

(58) Field of Classification Search
CPC ............. H02K 9/19; H02K 1/32; H02K 9/193
(Continued)

(56) References Cited

U.S. PATENT DOCUMENTS 2,862,119 A * 11/1958 Else .................... H02K 9/19
310/54
2,894,155 A * 7/1959 Labastie ............... H02K 9/19
188/264 D
(Continued)

FOREIGN PATENT DOCUMENTS

CN    1249558 A    4/2000
DE    478380    6/1929
(Continued)

OTHER PUBLICATIONS

Prof. Ingo Rechenberg—Vorlesungen: Bionik und Evolutionsstrategie; gefunden In: http://www.bionik.tu-berlin.de/institut/skript/s2skript.htm; Oct. 19, 2012; 6 Blatt.
(Continued)

*Primary Examiner* — Burton Mullins
(74) *Attorney, Agent, or Firm* — Henry M. Feiereisen LLC (57) ABSTRACT

The invention relates to an electrical machine (1, 51), in particular an asynchronous machine, comprising a stator (2), a rotor (4) which is rotatably mounted about a rotation axis (3) and magnetically interacts with the stator (2) during operation of the electrical machine (1, 51), a shaft (5) on which the rotor (4) is fixed and which has an axial hole (6), and an inflow element (7, 47) which extends into the axial hole (6) such that a coolant (15), in particular a cooling liquid (15), can flow into the axial hole (6) from the inflow element (7, 47). The invention also relates to a cooling system (50) comprising an electrical machine (1, 51) and a coolant circuit (55) for transporting the coolant (15), in
(Continued)

particular the cooling liquid (15), through the axial hole (6), and to a vehicle (61) comprising a cooling system (50).

17 Claims, 5 Drawing Sheets

(51) Int. Cl.
| | | |
|---|---|---|
| H02K 1/32 | (2006.01) | |
| H02K 9/193 | (2006.01) | |
| B60L 3/00 | (2006.01) | |
| B60L 11/18 | (2006.01) | |
| H02K 17/16 | (2006.01) | |

(52) U.S. Cl.
CPC ............ *B60L 11/1803* (2013.01); *H02K 1/32* (2013.01); *H02K 9/193* (2013.01); *H02K 17/165* (2013.01); *B60L 2220/12* (2013.01); *B60L 2220/50* (2013.01); *B60L 2240/36* (2013.01); *B60L 2240/421* (2013.01); *B60L 2240/425* (2013.01); *H02K 17/16* (2013.01); *Y02T 10/641* (2013.01); *Y02T 10/642* (2013.01); *Y02T 10/7005* (2013.01)

(58) Field of Classification Search
USPC .............................. 310/54; 384/473; 464/183
See application file for complete search history.

(56) References Cited

U.S. PATENT DOCUMENTS

| | | | | |
|---|---|---|---|---|
| 3,060,335 A | * | 10/1962 | Greenwald | H02K 9/19 310/43 |
| 3,562,564 A | | 2/1971 | Potter | |
| 4,309,635 A | * | 1/1982 | Sei | H02K 17/165 310/125 |
| 5,319,272 A | * | 6/1994 | Raad | H02K 11/042 310/54 |
| 5,589,720 A | * | 12/1996 | Berger | H02K 9/19 310/54 |
| 6,191,511 B1 | * | 2/2001 | Zysset | H02K 9/19 310/53 |
| 6,329,731 B1 | * | 12/2001 | Arbanas | F16H 57/0416 310/52 |
| 7,489,057 B2 | * | 2/2009 | Zhou | H02K 9/19 310/61 |
| 7,994,668 B2 | * | 8/2011 | Gerstler | H02K 1/2773 310/156.48 |
| 8,450,888 B2 | * | 5/2013 | Shafer | H02K 1/20 310/54 |
| 2011/0316380 A1 | | 12/2011 | Büttner et al. | |
| 2012/0133236 A1 | | 5/2012 | Büttner et al. | |
| 2012/0169158 A1 | | 7/2012 | Büttner et al. | |
| 2012/0187796 A1 | | 7/2012 | Büttner et al. | |
| 2012/0205996 A1 | | 8/2012 | Büttner et al. | |
| 2013/0098585 A1 | * | 4/2013 | Franzen | H02K 9/19 165/104.31 |
| 2013/0175892 A1 | | 7/2013 | Büttner et al. | |
| 2013/0187512 A1 | | 7/2013 | Büttner et al. | |

FOREIGN PATENT DOCUMENTS

| | | | | |
|---|---|---|---|---|
| DE | 478380 C | | 6/1929 | |
| DE | 4002245 A1 | | 8/1991 | |
| DE | 2458216 A2 | * | 5/2012 | ............... F04C 2/16 |
| EP | 0824287 A1 | | 2/1998 | |
| EP | 2254221 A2 | | 3/2010 | |
| EP | 2299565 A1 | | 3/2011 | |
| EP | 2299565 BI | | 8/2012 | |
| EP | 2541737 | * | 1/2013 | ............... H02K 1/32 |
| JP | S55127868 A | | 10/1980 | |
| JP | H 02197237 | | 8/1990 | |
| SU | 862317 A1 | | 9/1981 | |

OTHER PUBLICATIONS

Drehdurchführung Wikipedia;—Evolution Rohrkrümmer—gefunden am Oct. 19, 2012: www.wikipedia.org/w/index.php?titleDrehdurchf%C3%6Chrung& . . . ; Drehdurchführung Wikipedia;—Evolution Rohrkrümmer—gefunden am Oct. 19, 2012: www.wikipedia.org/w/index.php?title=Drehdurchf%C3%BChrung& . . . ; 5 Blatt.
Wellendichtring—gefunden in www.wikipedia.org/w/index.php?title=Wellendichtring&oldid=8591 . . . ; am Oct. 19, 2012; 4 Blatt.

\* cited by examiner

ELECTRICAL MACHINE HAVING A ROTOR FOR COOLING THE ELECTRICAL MACHINE

CROSS-REFERENCES TO RELATED APPLICATIONS

This application is the U.S. National Stage of International Application No. PCT/EP2013/054492, filed Mar. 6, 2013, which designated the United States and has been published as International Publication No. WO 2013/131949 and which claims the priority of German Patent Application, Serial No. 10 2012 203 687.0, filed Mar. 8, 2012, pursuant to 35 U.S.C. 119(a)-(d).

BACKGROUND OF THE INVENTION

The invention relates to an electrical machine, in particular an asynchronous machine, having a rotor for cooling the electrical machine. The invention also relates to a cooling system for cooling an electrical machine and to a vehicle comprising a cooling system for cooling an electrical machine.

An electrical machine is used to convert electrical energy into mechanical energy and vice versa.

When converting mechanical energy into electrical energy, the electrical machine is used as a generator.

When converting electrical energy into mechanical energy, the electrical machine is used as a motor.

In both cases it is desirable to achieve a high degree of efficiency at a high power density. High efficiency is necessary in order to enable energy to be provided cost-effectively and in a resource-conserving manner. A high power density is necessary, as it is desirable to produce electrical machines with lower material input less expensively, or to construct lightweight electrical machines for weight-sensitive applications.

Examples of weight-sensitive applications are those in which the supporting structure for the electrical machine is costly or the electrical machine is transported from one location to another in the application.

Two examples of weight-sensitive applications are wind turbines or electric vehicles.

In order to achieve high efficiency at a high power density, the principles and designs of the electrical machines and their cooling are being improved.

SUMMARY OF THE INVENTION

The object underlying the invention is therefore to provide an electrical machine having a means for the efficient cooling thereof.

According to one aspect of the invention, the object is achieved by an electrical machine, which is in particular an asynchronous machine and comprises
 a stator,
 a rotor which is rotatably mounted about an axis of rotation and interacts magnetically with the stator during operation of the electrical machine,
 a shaft on which the rotor is fixed and which has an axial bore
 an inflow element which extends into the axial bore such that a coolant, in particular a cooling liquid, can flow out of the inflow element into the axial bore.

According to another aspect of the invention, the object is achieved by a cooling system which comprises an electrical machine according to the invention and a coolant circuit for transporting the coolant, in particular the cooling liquid, through the axial bore.

According to still another aspect of the invention, the object is also achieved by a vehicle which comprises a cooling system according to the invention.

An electrical machine according to the invention has a stator and a rotor which is rotatably mounted about an axis of rotation. The rotor is fixed to a shaft. The shaft is rotatably mounted in the housing of the electrical machine by means of bearings. The bearings used can be e.g. sleeve or roller bearings. In the case of roller bearings, it is rotatably mounted via rolling elements which are disposed between an inner race and an outer race. The inner race is disposed on the shaft and the outer race in the housing of the electrical machine such that the shaft is rotatably mounted in the housing. In the case of a ball bearing, the rolling elements are balls, for example. Lubricants can be used to reduce the friction between the inner race and the rolling elements and between the outer race and the rolling elements.

In the case of the sleeve bearing, the outer race rotates relative to the inner race. Lubricants can be used here to reduce the friction between the outer and inner race.

During operation of the electrical machine, the rotor can be made to rotate, and mechanical energy is converted into electrical energy by the magnetic interaction between rotor and stator. The electrical energy can be drawn from a stator winding by connecting an electrical load.

During operation of the electrical machine, electrical energy can also be supplied via a stator winding and converted into mechanical energy by the magnetic interaction between stator and rotor. This causes the rotor to rotate and at the shaft mechanical energy can be transmitted to a mechanical load in the form of a rotational movement.

In order to enable a magnetic interaction between stator and rotor to take place during operation of the electrical machine, the rotor has permanent magnets, or has a winding with which a magnetic field can be generated. The rotor winding can consist of a plurality of turns or—as in the case of an asynchronous motor—a single turn. The winding can be connected to an electrical circuit, or be short-circuited. An example of an electrical machine having a shorted winding on the rotor is a squirrel cage asynchronous machine, wherein the squirrel cage acts as a rotor.

The stator can have a plurality of windings which are disposed circumferentially around the stator. A rotating magnetic field can be produced by the windings during operation of the electrical machine. If the electrical machine is used as a motor, i.e. to convert electrical energy into mechanical energy, the windings can be supplied with electrical energy in a phase-shifted manner and thus provide a simple means of causing the rotor to rotate. The windings can be controlled by taking the electrical energy from a 3-phase AC system or a power converter. A converter allows the stator windings to be controlled with any required phase offset and different frequencies of the electric currents or voltages, so that the rotational speed of the shaft can be varied during operation of the electrical machine.

The rotor can also have a plurality of windings if this is necessary for the magnetic interaction with the stator, or for startup of the electrical machine, for maintaining operation or for stopping the electrical machine.

When an electrical machine is used as a generator, the same arrangements of windings can be used as for an electrical machine used as a motor.

In order to achieve efficient cooling of the electrical machine, the shaft has an axial bore. Here "axial" is to be understood as meaning a direction along the axis of rotation of the shaft. A coolant can flow into the axial bore through an inflow element which extends into the axial bore. Thus efficient cooling can be achieved for the electrical machine by using a cooling liquid as coolant. Because of its higher thermal capacity, the use of a cooling liquid allows improved dissipation of waste heat produced in the electrical machine compared to cooling with a gas, e.g. air.

Another advantage of the electrical machine according to the invention is that the inflow element and the axial bore enable the electrical machine to be cooled efficiently by a cooling liquid without the cooling liquid coming into contact with parts of the electrical machine which carry an electric current during operation of the electrical machine. Contact of the cooling liquid with current-carrying components of the electrical machine would impair the operation of the electrical machine or even destroy it, as the cooling liquids generally have a certain electrical conductivity.

This also prevents a cooling liquid, by virtue of its mass, from obstructing the rotational movement of the rotor during operation of the electrical machine. This would be the case, for example, if the cooling liquid were to be between rotor and stator.

It is also advantageous to provide an electrical machine with an inflow element and an axial bore in the shaft if the electrical machine's rotor design results in increased heating of the rotor during operation, particularly for a specific operating state. An operating state with increased heating of the rotor can arise e.g. at startup, during an operating phase requiring an increased energy output, or at the end of operation of the electrical machine.

Thus particularly in the case of an asynchronous machine it is advantageous if it has the shaft with the axial bore, and the inflow element extends into the axial bore so that the rotor can be cooled by a cooling liquid.

In addition to the advantages already cited, a cooling system according to the invention also has the advantage, among other things, that an electrical machine according to the invention can be cooled independently of the operation or operating state thereof using a coolant.

In addition to the advantages already cited, a vehicle according to the invention also has the advantage, among other things, that if the vehicle is stationary or is traveling at reduced speed, cooling by the cooling system can be used to compensate for lower or non-existent airstream cooling for the electrical machine. This is possible due to the fact that the cooling system comprising an electrical machine according to the invention can also cool a stationary rotor by enabling the coolant to be transported through the inflow element and the axial bore of the rotor irrespective of the rotor speed, i.e. independently of electrical machine operation. This also applies in the case where the electrical machine is used for vehicle propulsion.

Advantageous embodiments of the invention are set forth in the dependent claims.

According to an advantageous embodiment of an electrical machine according to the invention, the electrical machine comprises a chamber which is disposed at an open end of the shaft such that the coolant, in particular the cooling liquid, can flow out of the axial bore into the chamber, and the chamber is delimited in the axial direction by an axial boundary which enables the coolant, in particular the cooling liquid, to be spirally guided around the axis of rotation into a coolant outlet. The coolant, in particular the cooling liquid, is therefore swirled by the rotation of the rotor during operation of the electrical machine. The swirl is advantageously utilized by the axial boundary to guide the coolant, in particular the cooling liquid, along the axial boundary into the coolant outlet. Therefore no or less energy is required to enable the coolant, in particular the cooling liquid, to flow through the electrical machine, in particular the rotor. More efficient cooling of the electrical machine is therefore achieved.

The embodiment also provides efficient cooling for electrical machines that are operated in both directions of rotation about the axis of rotation. In a particular application, operation of the electrical machine generally takes place in one of the two directions of rotation for the greater proportion of the time. The axial boundary can be implemented such that the axial boundary allows the coolant, in particular the cooling liquid, to spiral around the axis of rotation into a coolant outlet for the direction of rotation prevailing for the greater proportion of the time.

The axial boundary lies on a side of the chamber opposite the axial bore in the axial direction in order to delimit the chamber there such that the coolant, in particular the cooling liquid, cannot leave the chamber in the axial direction on the opposite side.

The coolant outlet can be provided in a radial boundary of the chamber, so that the axial boundary directs the coolant, in particular the cooling liquid, into the coolant outlet with the aid of centrifugal force.

The coolant outlet can extend into the chamber through a cutout in a radial boundary of the chamber. Thus the coolant, in particular the cooling liquid, can be guided by the axial boundary into the coolant outlet without the aid of centrifugal force.

In another advantageous embodiment of an electrical machine according to the invention, the inflow element has an axial opening. Thus the coolant, in particular the cooling liquid, can enter the chamber or the axial bore axially parallel to the axis of rotation.

In another advantageous embodiment of an electrical machine according to the invention, the inflow element has an inlet pipe extending into the axial bore.

In particular, the inlet pipe extends so far into the axial bore that, in the case of cooling with cooling liquid, the cooling liquid flows out of the inflow element close to components mounted in the vicinity of a second end axially opposite the open end of the shaft, which components are cooled almost as well as the components located near the open end of the shaft. These are components that require cooling, as they cause electrical or mechanical malfunction of the electrical machine if they are subjected to excessive heating. An example of a component, the heating of which can result in a mechanical malfunction, is the bearing for supporting the rotor at the second end of the shaft. An example of a component, the heating of which can result in an electrical malfunction, is a rotor winding.

If the inlet pipe is to extend far into the axial bore, this is advantageously achieved in a simple manner by implementing the inflow element as an inlet pipe.

The axial bore is advantageously closed near the second end. The second end is then a closed end. For cooling of the electrical machine, this means that the cooling liquid can leave the axial bore at the open end of the shaft through the inlet pipe as far as the closed end of the axial bore and from there through a duct, wherein the duct is constituted by a boundary of the axial bore and an external surface of the inlet pipe. In particular, the external surface of the inlet pipe can form a hollow cylindrical duct with the boundary of the axial bore. At the end of the shaft, the hollow cylindrical duct can extend into a chamber which can be a hollow cylindrical chamber concentric with the hollow cylindrical duct in order to accommodate the cooling liquid flowing out of the axial bore. At least part of the cross-section of the coolant outlet can extend into the hollow cylindrical chamber through a cutout in a radial boundary of the hollow cylindrical chamber. Thus the cooling liquid can be guided by the axial boundary into the coolant outlet unassisted by centrifugal force. The cooling liquid leaves the in particular hollow cylindrical duct or the hollow cylindrical chamber via the coolant outlet.

It has been found that, as the rotor speed increases, an electrical machine according to the invention does not present a greater resistance to the flowing cooling liquid, but the resistance is even reduced.

Thus it is possible to cool an electrical machine according to the invention efficiently at high rotor speed, in particular in the range of approximately 4000 to 20,000 rpm. Because of the high rotor speed, the electrical machine can produce a large output within a small space. The cooling liquid is pumped through the inlet pipe into the axial bore depending on the cooling requirement of the electrical machine. Because of the knowledge that, with increasing rotor speed, in particular at high rpm, the electrical machine according to the invention causes a lower pressure loss in the cooling liquid, the cooling liquid can flow from the open end of the axial bore to the far second closed end, be deflected there and flow back again to the open end of the shaft without this resulting in a higher energy input for pumping the cooling liquid when the rotor speed is high. Efficient cooling of the electrical machine is therefore possible. Because of the lower pressure losses, an inexpensive design is also possible, as the cooling liquid flows into and out of the rotatably mounted shaft from one side only.

Because of its simple shape, the inlet pipe can be inexpensively produced. Even when the motor is at rest, i.e. when the rotor is stationary, the cooling liquid can be pumped freely through the inlet pipe and the axial bore, thereby providing an efficient means of cooling when the electrical machine is at rest.

In another advantageous embodiment of an electrical machine according to the invention, an external surface of the inlet pipe is a smooth surface. Because of the lower friction between the cooling liquid and the external surface of the inlet pipe, the cooling efficiency is increased still further.

This can be inexpensively achieved, for example, by the inlet pipe being a die casting.

The inlet pipe can also be produced such that the arithmetic mean roughness of the external surface is better than 50 µm, in particular better than 3.2 µm.

In another advantageous embodiment of the electrical machine according to the invention, an internal surface of the inlet pipe is a smooth surface. Thus a lower friction between the cooling liquid pumped through the inlet pipe and the internal surface is achieved. This provides a more efficient cooling means.

A corresponding internal surface of the inlet pipe can be provided by producing the inlet pipe so as to ensure an arithmetic mean roughness of the internal surface of better than 50 µm, in particular better than 3.2 µm.

In another advantageous embodiment of the electrical machine according to the invention, the inlet pipe has a high thermal conductivity. The coolant, in particular the cooling liquid, flowing back through the duct absorbs the waste heat of the rotor by being in direct contact with the boundary of the axial bore. The closer the coolant in the duct comes to the open end of the axial bore, the higher its temperature and the more waste heat it can absorb from the rotor via the shaft. As a result, the electrical machine at least during operation has different temperatures along its axial extent. As the inlet pipe has a high thermal conductivity, the coolant in the duct can also transfer the waste heat directly through the inlet pipe to the coolant present in the inlet pipe. This ensures a more uniform temperature distribution of the electrical machine along its axial extent, thus providing more efficient cooling. For this purpose the inlet pipe must have a thermal conductivity that at least corresponds to or is better than that of the shaft. In particular, the inlet pipe must be made of a material which has a specific thermal conductivity that corresponds to, or is better than, a specific thermal conductivity of a shaft material. Thus, for example, steel can be used for the shaft and aluminum for the inlet pipe.

In another advantageous embodiment of the electrical machine according to the invention, the closed end of the axial bore has a transfer element which has, on a side facing the inflow element, a recess for deflecting the coolant, in particular the cooling liquid. The transfer element reduces the pressure drop in a coolant circuit comprising the inflow element and the axial bore, as turbulence in the coolant is minimized. With a smaller pressure drop in the coolant circuit, less coolant pump power is required, thus saving energy. If the inflow element has an inlet pipe, the recess can be annular.

For the embodiment in which the inflow element has an inlet pipe, a recess that is rotationally symmetrical with respect to the axis of rotation is advantageous.

In particular, it is advantageous to implement the recess such that the centrifugal force assists the deflection of the coolant. This can be achieved by orienting a boundary of the recess such that the coolant particles forced outward by the centrifugal force are subject to an axial motion component.

In another advantageous embodiment of the electrical machine according to the invention, the transfer element has a high thermal conductivity. As the transfer element is located in the shaft at a position that needs to meet less exacting requirements in respect of mechanical stability, a material of high thermal conductivity can be selected for the transfer element, irrespective of any stability requirement. Also the thickness of the transfer element, i.e. its extent in the direction of the axis of rotation, can be selected very large, so that a high thermal conductivity can also be achieved over the cross-section of the transfer element.

Thus copper can be used as the material for the transfer element.

High thermal conductivity is also to be understood here as meaning that the transfer element conducts heat as well as or better than the shaft. For the same transfer element and shaft cross-section through which the waste heat flows, this would mean that the specific thermal conductivity of a transfer element material is the same as or better than the specific thermal conductivity of a shaft material.

The transfer element can advantageously be of a material that not only has a higher specific thermal conductivity than a shaft material, but also a higher coefficient of thermal expansion. This ensures that at higher temperatures the transfer element expands more than the shaft, thereby providing better contact between the transfer element and the shaft at higher temperatures. Better thermal transfer is therefore achieved.

In another advantageous embodiment of an electrical machine according to the invention, the rotor comprises a laminated core of a first material and an integrally cast short-circuiting ring of a second material having a specific thermal conductivity that is greater than a specific thermal conductivity of the first material, wherein the integrally cast short-circuiting ring has a fixing area which is directly attached to the shaft. The first material for the laminated core of the rotor is defined by the electromagnetic characteristics of the electrical machine. Electric steel sheets are generally used for the laminated core. Thus, iron/silicon alloys are usually employed as the first material. It has now been recognized that the short-circuiting ring can comprise a second material whose specific thermal conductivity is lower than that of the first material, without the electromagnetic characteristics of the electrical machine being impaired. In particular it has been recognized that it is advantageous to use the short-circuiting ring to transfer waste heat of the rotor to the shaft.

The second material is advantageously aluminum.

It is also advantageous for the short-circuiting ring to be directly adjacent to the transfer element in the axial direction. This enables the waste heat to be transferred to the coolant in the axial bore over a short distance using materials of high thermal conductivity.

In another advantageous embodiment of the electrical machine according to the invention, the fixing area is disposed between a shrink ring and the shaft. As the shrink ring expands less with increasing heating than the fixing area of the integrally cast short-circuiting ring, the shrink ring presses the fixing area against the shaft. Thus particularly at high temperatures a contact surface is maintained between the integrally cast short-circuiting ring and the shaft. The waste heat of the rotor can therefore be advantageously transferred to the shaft. This allows efficient cooling.

The shrink ring is advantageously made of a material having a linear coefficient of thermal expansion that is at least a factor of two lower than that of the second material. A steel shrink ring may be cited as an example.

The shrink ring also advantageously has a balancing bore. For the rotor of the electrical machine, in many cases an unbalance caused by asymmetrical weight distribution has to be compensated. The shrink ring advantageously provides a defined weight along a circumference of the rotor, so that along the circumference of the shrink ring a location can be determined at which the unbalance can be rectified by removing weight. The weight can be advantageously removed by drilling a hole of suitable depth.

The efficient means of cooling by dissipating waste heat from the rotor via the fixing area of the integrally cast short-circuiting ring can be advantageously used for a rotor having copper rods inserted in grooves of the laminated core. The copper rods have a high thermal conductivity so that the waste heat can be advantageously transported by the copper rods into the short-circuiting ring and from there in the inventive manner via the fixing area into the coolant.

In another advantageous embodiment of the electrical machine according to the invention, a seal and a leakage chamber are disposed on the shaft such that the seal can prevent the coolant, in particular the cooling liquid, from flowing into the leakage chamber apart from a residual leakage. The seal and the leakage chamber enable the electrical machine to be cooled using a cooling liquid as coolant and therefore provide efficient cooling. A seal on the shaft can never meet every requirement. The seal shall on the one hand prevent the ingress of cooling liquid and, on the other, shall not impede shaft rotation. These requirements are mutually exclusive. Particularly when the rotor and therefore the shaft is rotating at high speed, i.e. between 4000 and 20,000 rpm, the seal is subject to heavy wear or impedes rotation of the rotor if it is made of an expensive wear-resistant material.

All variants of known seals can be used. The seal can be implemented e.g. as a radial seal around the axis of rotation or as an axial seal at the open end of the shaft. For the seal, e.g. a sealing system can also be used which comprises a plurality of sections which interact in order to be able to prevent the coolant, in particular the cooling liquid, from flowing into the leakage chamber apart from a residual leakage.

In the light of these requirements, disposing a leakage chamber behind the seal makes it possible to provide efficient cooling using a cooling liquid. This is because cooling liquid which penetrates between the seal and the shaft as residual leakage passes into the leakage chamber. The likelihood of the cooling liquid causing a mechanical malfunction in respect of the bearings or electrical malfunctions in respect of the winding of the rotor and stator is reduced. In the case of the electrical machine, a sufficient useful life for the operation of the electrical machine can therefore be guaranteed despite using a cooling liquid which flows in the shaft.

The leakage chamber can have a size which is designed as a function of the seal such that it can accommodate the cooling liquid penetrating between seal and shaft over a prescribed service life. Thus the leakage chamber can advantageously prevent ingress of cooling liquid into the housing, in particular the bearings, the rotor winding or into the stator winding without the leakage chamber needing to have an opening for drainage of the cooling liquid.

The leakage chamber can also have an opening for drainage of the cooling liquid. Thus the leakage chamber can be made smaller and no assumptions need to be made concerning the service life of the electrical machine in order to dimension the leakage chamber accordingly.

The leakage chamber can also have a removable closure. Thus the cooling liquid that has collected there can be advantageously drained off by removing the closure before the leakage chamber overflows. The closure can be removed prior to an impending overflow of the leakage chamber or as part of maintenance in order to allow cooling liquid which has possibly collected to be drained from the electrical machine. The leakage chamber can then be re-sealed using the closure.

The leakage chamber can be partially bounded by components of the electrical machine. Examples of such components are a bearing shield or a seal holder. The leakage chamber can also be delimited by a panel providing separation from a chamber in which the bearing is disposed. The panel then advantageously constitutes another barrier that the cooling liquid has to overcome in order to reach the bearing, the rotor or the stator. The panel can be mounted in a form- or force-fit manner in the housing of the electrical machine, an inflow element support or the bearing shield. The panel can also be integrally connected to the housing, inflow element support or bearing shield. The panel can also be designed as a cover plate.

In another advantageous embodiment of the electrical machine according to the invention, the seal is disposed on the shaft such that a fluid can act on the seal surface facing the fluid in order to reduce the ingress of the residual leakage. Thus less coolant enters the leakage chamber.

The fluid can thus act on the surface facing the fluid such that the seal is pressed against the shaft. If the seal is a seal system comprising a plurality of sections which interact in order to be able to prevent ingress of coolant, in particular of cooling liquid, into the leakage chamber apart from a residual leakage, the fluid can act on the surface facing the fluid such that the different sections are pressed against one another.

If the cooling liquid cannot act on the seal surface facing the fluid because of a retaining element, the fluid is a gas, in particular air, which is in a cavity between the retaining element and the seal. In this case the retaining element is located between the open end of the axial bore and the cavity. The retaining element prevents or reduces the ingress of cooling liquid into the cavity. The retaining element can be a seal, in particular a gap seal.

If no retaining element is present, the cooling liquid is guided past the seal and presses it against the shaft. In this case the fluid is the cooling liquid.

In both cases, as the rotor speed increases, in particular at high motor rpm, the fluid exerts greater pressure on the seal.

In another advantageous embodiment of the electrical machine according to the invention, the leakage chamber is at least partially bounded by a radial surface of the shaft and a slinger disk is provided on the radial surface of the shaft. The slinger disk is connected to the shaft such that it is set in motion by rotation of the shaft. Movement of the slinger disk causes the cooling liquid penetrating between the seal and the shaft to be projected against the boundary of the leakage chamber so that the cooling liquid cannot get into the electrical machine, in particular into the bearing, the rotor or the stator. Thus the cooling liquid that has penetrated collects at the boundary of the leakage chamber and can be kept there or drained off via an opening in the leakage chamber.

The slinger disk is in particular designed such that cooling liquid, in particular cooling liquid droplets, are radially transported by centrifugal force occurring when the slinger disk rotates to an outer edge of the slinger disk where they are projected by the slinger disk. In particular, the cooling liquid or cooling liquid droplets can reach the slinger disk by flowing along the radial surface of the shaft to the slinger disk.

The slinger disk can be implemented by a diameter difference in the shaft. This diameter difference can be implemented by grooves or shoulders in the shaft. These can be very simply produced in the shaft on a lathe.

The slinger disk can also have a large diameter and thus additionally cover the bearing or openings into the electrical machine's interior like a shield.

In another advantageous embodiment of the electrical machine according to the invention, a seal is disposed in front of the rotor and, behind the seal, a leakage chamber, viewed from the open end of the shaft along the axis of rotation, said leakage chamber being at least partly bounded by a radial surface of the shaft and of the seal. Disposing the leakage chamber, which is at least partially bounded by a radial surface of the shaft and of the seal, behind the seal allows space-saving cooling of the electrical machine using a cooling liquid as coolant. Thus more efficient cooling of the electrical machine is achieved.

In another advantageous embodiment of the electrical machine according to the invention, the seal is disposed on the shaft such that a fluid can act on a fluid-facing seal surface that is nearer the open end of the axial bore than a seal surface facing the leakage chamber, so that the fluid can press the seal against the shaft. As a result of the fluid pressing the seal against the shaft, less cooling liquid can pass between seal and shaft and thus enter the leakage chamber.

If the cooling liquid cannot act on the seal surface facing the fluid because of a retaining element, the fluid is a gas, in particular air, which is in a cavity between the retaining element and the seal. In this case the retaining element is located between the open end of the axial bore and the cavity. The retaining element prevents or reduces the ingress of cooling liquid into the cavity. The retaining element can be a seal, in particular a gap seal.

If no retaining element is present, the cooling liquid is guided past the seal and presses against the shaft. In this case the fluid is the cooling liquid.

In both cases, as the rotor speed increases, in particular at high motor rpm, the fluid exerts greater pressure on the seal.

In both cases the seal is pressed more strongly against the shaft the higher the pressure in the cooling liquid.

On the surface facing the fluid, the seal can have recesses which improve the pressing of the seal against the shaft by the fluid.

The seal can also have curved areas which enable improved pressing of the seal against the shaft by the fluid. The curved areas can also be a reserve which adjust as the seal wears such that the seal always makes good contact with the shaft even when worn.

In another advantageous embodiment of a cooling system according to the invention, the coolant circuit comprises a coolant pump for transporting the coolant from the coolant pump to a coolant inlet of the electrical machine and from a coolant outlet of the electrical machine to the coolant pump. The coolant can thus be transported through the coolant circuit by the coolant pump independently of operation of the electrical machine. Thus the coolant flow rate necessary for efficient cooling, i.e. the volumetric flow of the coolant, can be adjusted using the coolant pump to dissipate the waste heat.

In another advantageous embodiment of a cooling system according to the invention, the coolant comprises water and an antifreeze. Efficient cooling is thereby achieved because of the high thermal capacity of the coolant. Even at low temperatures, a small amount of energy suffices to transport the coolant. This provides efficient cooling of the electrical machine.

An antifreeze that prevents corrosion of the cooling system, in particular in the electrical machine, or only allows it to a small extent is advantageous. Thus the antifreeze can in particular minimize or prevent corrosion of electrical machine components having steel as a material.

An advantageous embodiment of a vehicle according to the invention comprises a cooling system according to the invention.

BRIEF DESCRIPTION OF THE DRAWING

The above described characteristics, features and advantages of this invention and the manner in which they are achieved will become clearer and more readily comprehensible in connection with the following description of the exemplary embodiments which will be explained in greater detail with reference to the accompanying drawings in which.

DETAILED DESCRIPTION OF PREFERRED EMBODIMENTS

Figure 1:
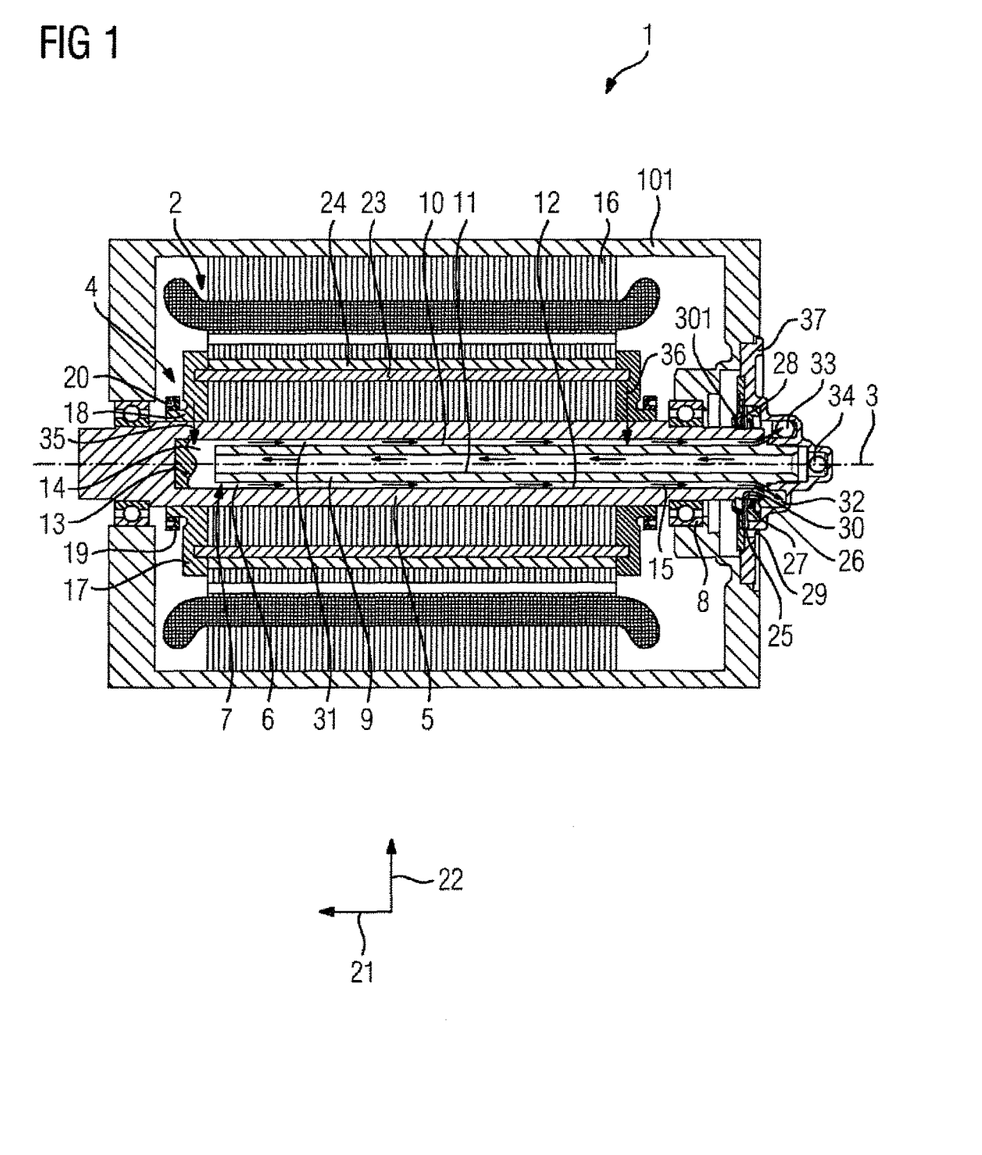
FIG. 1 shows a first exemplary embodiment of an electrical machine.

FIG. 1 shows an exemplary embodiment of an electrical machine 1 comprising a stator 2 and a rotor 4. The stator 2 is fixed in the housing 101. The rotor 4 is rotatably mounted about the axis of rotation 3, as the shaft 5 is mounted in the housing 101 via a bearing 8. The bearing 8 is a ball bearing in this exemplary embodiment.

For cooling, a cooling liquid 15 consisting of water and Glysantin G30® in a 50:50 ratio is used as the coolant 15.

The shaft 5 on which the rotor 4 is mounted has an axial bore 6. An inflow element 7 extends from an open end of the shaft 5 into the axial bore 6 such that a cooling liquid 15 can flow from the inflow element 7 into the axial bore 6. The inflow element 7 has an inlet pipe 9 which is mounted in a support 37 of the inflow element 7. The support 37 is fixed to the housing 101 of the electrical machine 1.

The arrow 21 specifies an axial direction of the electrical machine 1. The arrow 22 specifies a radial direction of the electrical machine 1.

For cooling of the electrical machine 1, the cooling liquid 15 flows through the coolant inlet 34 into the inlet pipe 9. In the inlet pipe 9 the coolant 15 flows in the direction of a closed end of the axial bore 6 where it leaves the inlet pipe 9 and is deflected by a transfer element 13. For this purpose the transfer element 13 has a recess 14 which is made rotationally symmetrical with respect to the axis of rotation 3 so that the cooling liquid exhibits only minimal turbulence caused by the deflection of the cooling liquid. The transfer element 13 is made of aluminum so that waste heat which it has absorbed at the boundary 12 of the axial bore 6 or at the closed end of the axial bore 6 can be largely transferred to the cooling liquid 15. The shaft 5 has been produced conventionally from steel. Because of the greater coefficient of thermal expansion of the transfer element 13 compared to the conventional steel of the shaft 5, the transfer element is pressed against the boundary 12 of the axial bore 6 so that, as the temperature increases, a better heat transfer between the boundary 12 of the axial bore 6 and the transfer element 13 is provided. After the coolant liquid 15 has been deflected by the transfer element 13, the cooling liquid 15 flows into the hollow cylindrical duct 31 formed by the boundary 12 of the axial bore 6 and the external surface 10 of the inlet pipe 9. At an open end of the shaft 5, the cooling liquid 15 then flows out of the hollow cylindrical duct 31 into the hollow cylindrical chamber 32. From there, the cooling liquid 15 leaves the hollow cylindrical chamber 32 through a coolant outlet 33 which extends with part of its cross-section into the hollow cylindrical chamber 32 through a cutout in a radial boundary of the hollow cylindrical chamber 32.

The rotor 4 has a laminated core 16 and copper rods 23 which are disposed in the grooves 4 of the laminated core 16. The copper rods 23 are short-circuited by integrally cast aluminum short-circuiting rings 17. In FIG. 1, a residual cross-section in the radial direction adjacent to the copper rods 23 is marked with a different hatching from that of the short-circuiting rings 17. The residual cross-section of the grooves 4 can be cast independently of integral casting of the short-circuiting rings 17 or be cast during integral casting of the short-circuiting rings 17 using aluminum.

The integrally cast short-circuiting rings 17 have a fixing area 18. This is attached directly on the shaft 5. In other words, a surface of the short-circuiting ring 17 in the vicinity of the fixing area 18 is in contact with the surface of the shaft 5. In order to ensure this contact between the short-circuiting ring 17 and the shaft 5 over a wide temperature range, a shrink ring 19 is disposed on the short-circuiting ring 17 such that the fixing area 18 is between the shrink ring 19 and the shaft 5. The shrink ring 19 is made of steel which expands less than the aluminum of the short-circuiting ring 17 with increasing temperature. The shrink ring 19 is used for adding balancing bores 20 during rotor balancing. The number and depth of the balancing bores 20 and their arrangement on the shrink ring is dependent on the individual unbalance of a rotor 4.

If the component parts of the rotor 4, in particular the short-circuiting rods 23, now heat up during operation of the electrical machine 1, the waste heat is transported via the good thermal conductivity of the copper rods 23 into the short-circuiting rings 17 and from the short-circuiting rings 17 via the fixing area 18 thereof into the shaft 5.

This is illustrated for one of the short-circuiting rings 17 in FIG. 1 by the arrow 35 which indicates a direction of heat transmission into the transfer element 13. The cooling liquid 15 absorbs the waste heat from the transfer element 13 and can transport it to a coolant outlet 33.

In the case of the other of the short-circuiting rings 17, the heat is transferred from the shaft 5 directly to the cooling liquid 15, as indicated by the arrow 36.

The inlet pipe 9 is an aluminum die-casting. The good thermal conductivity of the aluminum ensures more uniform cooling of the shaft 5 along the axis of rotation 3. In particular, more waste heat absorbed by the cooling liquid 15 in the hollow cylindrical duct 31 can be transferred to the cooling liquid 15 inside the inlet pipe 9 due to the good thermal conductivity of the inlet pipe 9. Thus the relatively cold cooling liquid 15 inside the inlet pipe 9 near the open end of the axial bore 6 can assist the cooling liquid 15 in the hollow cylindrical duct 31 by already absorbing therefrom a certain amount of the waste heat through the aluminum of the inlet pipe 9.

Figure 3:
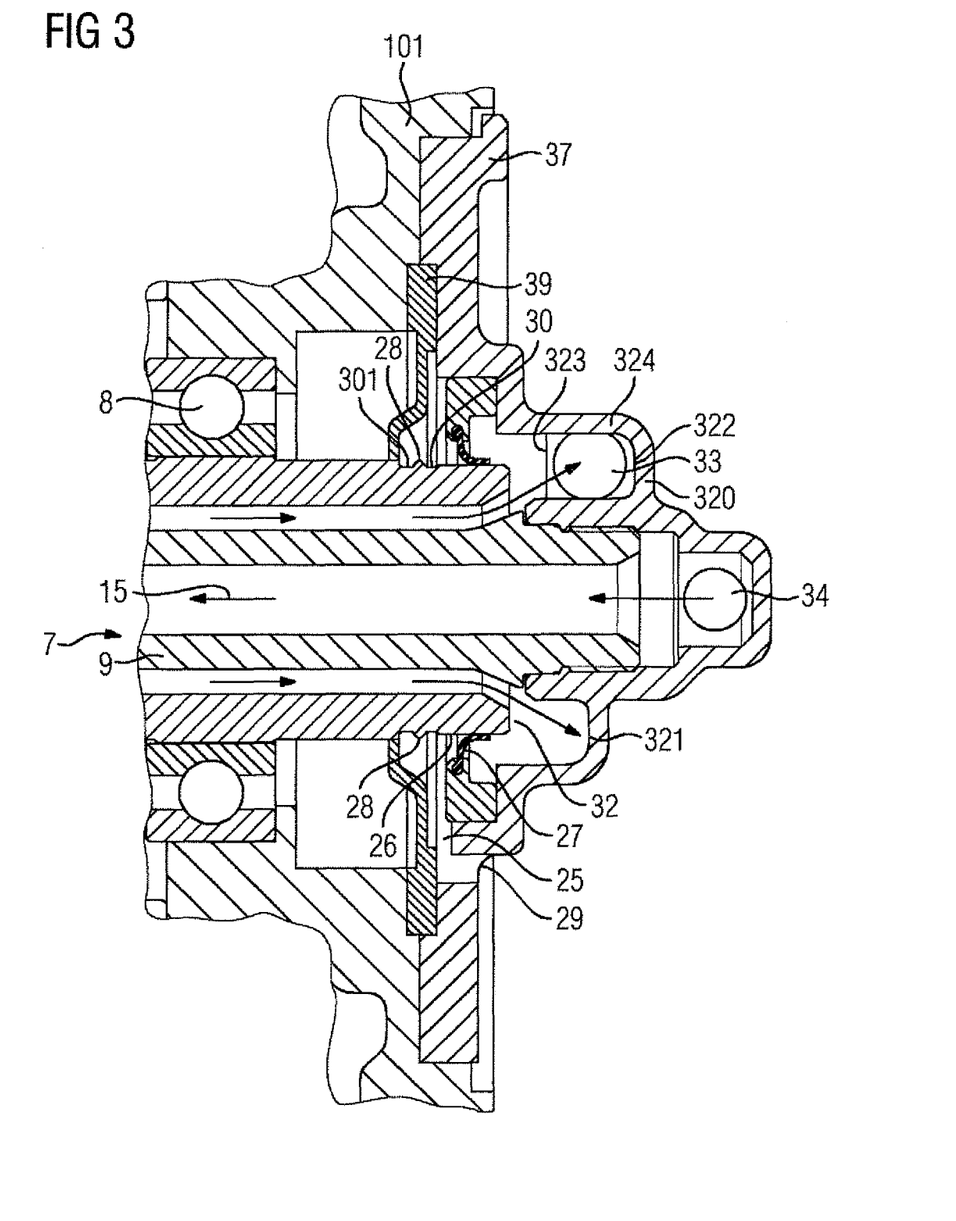
FIG. 3 shows an enlarged sub-area of FIG. 1 near the open end of a shaft.

FIG. 3 shows an enlarged sub-area of FIG. 1 around the open end of the shaft 5.

Visible on the side opposite the axial bore 6 is the axial boundary 320 which delimits the hollow cylindrical chamber 32 and which enables the coolant 15, in particular the cooling liquid 15, to be spirally guided about the axis of rotation 3 from the section 321 of the axial boundary 320 disposed axially close to the shaft 5 to the section 322 of the axial boundary 320 disposed axially distant from the shaft 5. The coolant 15 is thus guided along the axial boundary 320 into the coolant outlet 33.

The coolant outlet 33 extends into the hollow cylindrical chamber 32 through a cutout in the radial boundary 324 of the hollow cylindrical chamber 32. In FIG. 3 this is illustrated by the fact that the boundary 323 of the coolant outlet 33 is inside the hollow cylindrical chamber 32.

Visible in FIG. 1 and FIG. 3 is the leakage chamber 25 which is at least partially bounded by a radial surface 26 of the shaft 5 and a seal 27. Also visible in FIGS. 1 and 3 is a slinger disk 28 as well as a drain opening 29 through which the cooling liquid 15 collecting in the leakage chamber 25 can drain away.

The slinger disk 28 causes the cooling liquid 15 to be thrown off the shaft 5. The slinger disk 28 is formed by a groove 301 and a shoulder 30 in the shaft 5. The shoulder 30 has an additionally implemented groove. The seal 27 is disposed on the shaft 5 such that the cooling liquid 15 can press the seal 27 against the shaft 5.

FIG. 3 also shows that the leakage chamber is partially delimited by a panel 39. The panel 39 separates the leakage chamber from a chamber in which the bearing 8 is disposed. The panel 39 thereby advantageously constitutes an additional barrier which the cooling liquid 15 has to overcome in order to reach the bearing 8, the rotor 4 or the stator 2.

Figure 4:
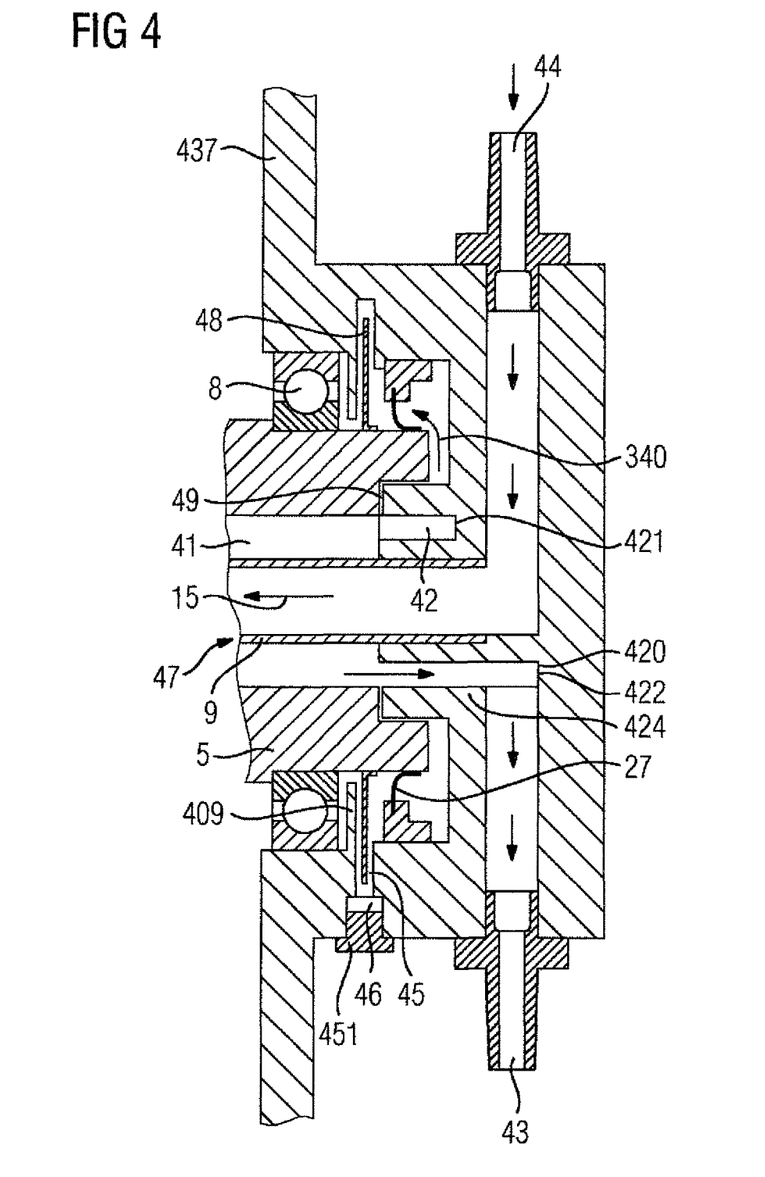
FIG. 4 shows another exemplary embodiment of an electrical machine, wherein an area around an open end of a shaft is depicted.

FIG. 4 shows another exemplary embodiment of an electrical machine 1, wherein an area around an open end of a shaft 5 is shown. FIG. 4 shows only the section of the electrical machine 1 that has changed compared to the exemplary embodiment of an electrical machine 1 in FIG. 1. All the other component parts of the electrical machine are of the same design as in FIG. 1.

The cooling liquid 15 enters the support 437 of the inflow element 7 via the coolant inlet 45, and passes from there into the inlet pipe 9. After the cooling liquid has flowed through the inlet pipe 9, it flows through the transfer element 13 deflected into the hollow cylindrical duct 41. From the latter the cooling liquid 15 flows via the hollow cylindrical chamber 42 into the coolant outlet 43.

Visible on the side opposite the axial bore 6 is the axial boundary 420 which delimits the hollow cylindrical chamber 42 and enables the cooling liquid 15 to be spirally guided around the axis of rotation 3 from the part 421 of the axial boundary 420 disposed axially close to the shaft 5 to the part 422 of the axial boundary 420 disposed axially distant from the shaft 5. The coolant 15 is thus guided along the axial boundary 420 into the coolant outlet 43.

The coolant outlet 43 is mounted in a radial boundary 424 of the hollow cylindrical chamber 42 so that the axial boundary 420 guides the cooling liquid 15 into the coolant outlet 43 with the aid of centrifugal force.

In the exemplary embodiment in FIG. 4, a retaining element in the form of a gap seal 49 is provided at the transition of the shaft 5 to the support 437. The seal 27 is pressed against the shaft 15 by the air 340 in the cavity between the retaining element, i.e. the gap seal 49, and the seal 27.

In this exemplary embodiment the slinger disk 48 is implemented with a large diameter extending deep into the leakage chamber 45. Thus the slinger disk 48 not only has the task of projecting the cooling liquid deep into the leakage chamber 45, but also covers a remaining opening of the plate 409 to the bearing 8.

In this exemplary embodiment the leakage chamber is closed by a closure 451 so that the cooling liquid 15 collects at a collecting point 46 in the leakage chamber and can be drained off as part of necessary maintenance by removal of the closure 451.

Figure 2:
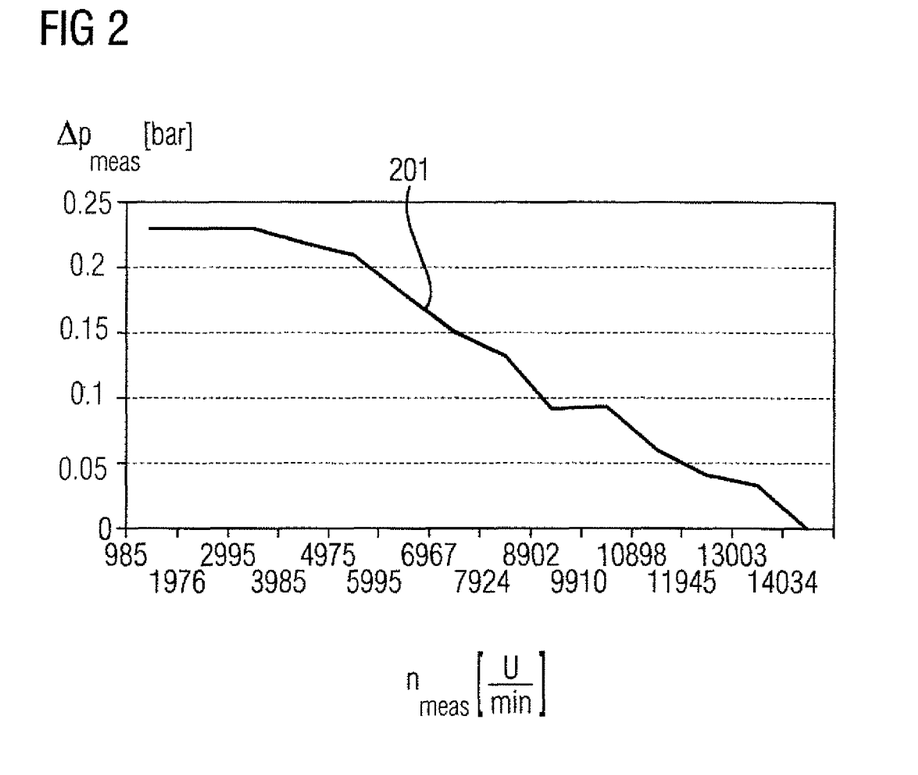
FIG. 2 shows the measured pressure drop as a function of the speed for a cooling system comprising an electrical machine according to the invention.

FIG. 2 shows the measured pressure drop $\Delta p_{meas}$ as a function of the speed $n_{meas}$ of the rotor of the electrical machine 1 for a cooling system 50 comprising an electrical machine 1 according to the invention. The measuring points have been determined on a first setup of the exemplary embodiment according to FIG. 4.

FIG. 2 shows that the pressure drop does not increase as the speed increases. Rather the measuring points indicate that the pressure drop even reduces from a speed of approximately 4000 rpm onwards.

Figure 5:
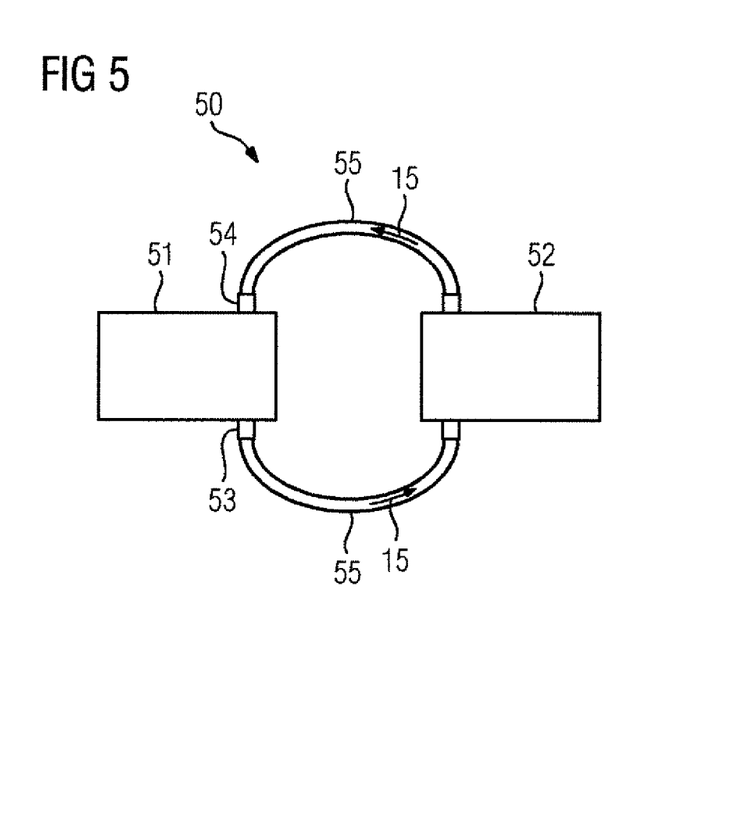
FIG. 5 shows an exemplary embodiment of a cooling system.

FIG. 5 shows an exemplary embodiment of a cooling system 50. The cooling system 50 comprises a coolant circuit 55 for transporting the cooling liquid 15 through the axial bore 6. The coolant circuit 55 comprises a coolant pump 52 for transporting the cooling liquid 15 from the coolant pump 52 to a coolant inlet 54 of the electrical machine 51 and from a coolant outlet 53 of the electrical machine 51 to the coolant pump 52.

Thus the coolant pump 52 pumps the cooling liquid 15 from the coolant pump 52 to a coolant inlet 54 of the electrical machine 51 and from there back to the coolant pump 52 via the coolant outlet 53.

In the exemplary embodiment in FIGS. 1, 3 and 4, the coolant inlet 54 is connected to the identically denoted coolant inlet having the reference characters 34 and 44, so that the cooling liquid can flow into the inlet pipe 9. Similarly, the coolant outlet 53 is connected to the identically named coolant outlet having the reference characters 33 and 43.

Figure 6:
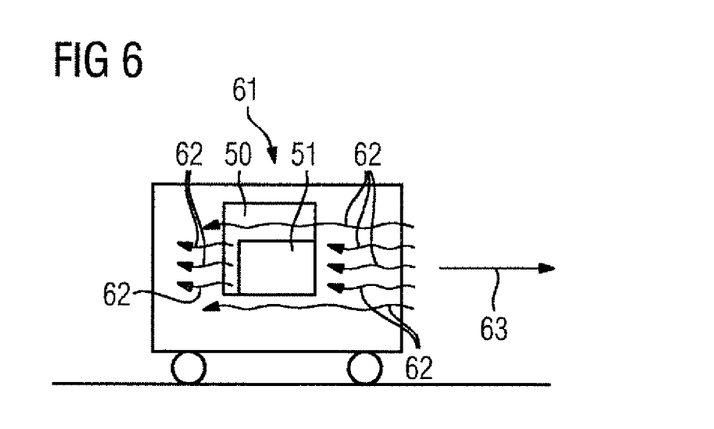
FIG. 6 shows an exemplary embodiment of a vehicle.

FIG. 6 shows an exemplary embodiment of a vehicle 61. Powered by the electrical machine 1, the vehicle 61, which is a motor vehicle, travels in a direction 63 at a first speed. This causes an airstream 62 to sweep via the electrical machine 52 which is mounted in or on the vehicle 61. As a result, the electrical machine 52 is subject to a degree of cooling. The electrical machine 52 is also cooled by the cooling system 50. Due to the inventive design of the electrical machine 52, the cooling system 50 can be cooled independently of operation or an operating state of the electrical machine 52.

In the exemplary embodiment in FIG. 4, instead of a retaining element in the form of a gap seal 49, an axial seal comprising two sections which can be pressed against one another can be provided at the transition of the shaft 5 to the support 437. The seal 27 could then be dispensed with or retained as an additional seal.

Although the invention has been illustrated and described in greater detail by the preferred exemplary embodiments, the invention is not limited by the examples disclosed, and other variations may be inferred therefrom by the average person skilled in the art without departing from the scope of protection sought for the invention.

The invention claimed is:

1. An electrical machine, comprising:
   a stator;
   a rotor mounted for rotation about an axis of rotation and interacting magnetically with the stator during operation of the electrical machine;
   a shaft on which the rotor is fixed and which has an axial bore;
   an inflow element sized to extend into the axial bore to enable a coolant to flow out of the inflow element and into the axial bore; and
   a chamber disposed at an open end of the shaft, said chamber being delimited in an axial direction by an external axial boundary having one section extending transversely to the axis of rotation and disposed axially close to the shaft and another section also extending transversely to the axis of rotation but disposed axially distant from the shaft and enabling the coolant to be spirally guided around the axis of rotation into a coolant outlet.

2. The electrical machine of claim 1, wherein the coolant is a cooling liquid.

3. The electrical machine of claim 1, wherein the inflow element has an inlet pipe sized to extend into the axial bore.

4. The electrical machine of claim 1, further comprising a transfer element disposed at a closed end of the axial bore and having a recess on a side facing the inflow element for deflecting the coolant, said transfer element for deflecting the coolant at the closed end of the axial bore having a greater coefficient of thermal expansion than the shaft and is pressed against a boundary of the axial bore so that as temperature increases a better heat transfer between the boundary of the axial bore and the transfer element is provided.

5. The electrical machine of claim 1, wherein the rotor comprises a laminated core of a first material and a short-circuiting ring cast on the laminated core and made of a second material which has a specific thermal conductivity that is greater than a specific thermal conductivity of the first material, said short-circuiting ring having a fixing area which is directly attached to the shaft.

6. The electrical machine of claim 1, further comprising a seal and a leakage chamber which are disposed on the shaft such that the seal is able to prevent the coolant from flowing into the leakage chamber.

7. The electrical machine of claim 6, wherein the leakage chamber is at least partially bounded by a radial surface of the shaft, and further comprising a slinger disk provided on the radial surface of the shaft.

8. The electrical machine of claim 6, wherein the seal is disposed on the shaft to enable a fluid to act on a surface of the seal facing the fluid and reduces ingress of the residual leakage.

9. A cooling system, comprising:
an electrical machine including a stator, a rotor mounted for rotation about an axis of rotation and interacting magnetically with the stator during operation of the electrical machine, a shaft on which the rotor is fixed and which has an axial bore, and an inflow element sized to extend into the axial bore to enable a coolant to flow out of the inflow element and into the axial bore;
a coolant circuit configured to transport the coolant through the axial bore; and
a chamber disposed at an open end of the shaft, said chamber being delimited in an axial direction by an external axial boundary having one section extending transversely to the axis of rotation and disposed axially close to the shaft and another section also extending transversely to the axis of rotation but disposed axially distant from the shaft and enabling the coolant to be spirally guided around the axis of rotation into a coolant outlet.

10. The cooling system of claim 9, wherein the coolant is a cooling liquid.

11. The cooling system of claim 9, wherein the inflow element has an inlet pipe sized to extend into the axial bore.

12. The cooling system of claim 9, wherein the electrical machine has a transfer element disposed at a closed end of the axial bore and having a recess on a side facing the inflow element for deflecting the coolant, said transfer element for deflecting the coolant at the closed end of the axial bore having a greater coefficient of thermal expansion than the shaft and is pressed against a boundary of the axial bore so that as temperature increases a better heat transfer between the boundary of the axial bore and the transfer element is provided.

13. The cooling system of claim 9, wherein the rotor comprises a laminated core of a first material and a short-circuiting ring cast on the laminated core and made of a second material which has a specific thermal conductivity that is greater than a specific thermal conductivity of the first material, said short-circuiting ring having a fixing area which is directly attached to the shaft.

14. The cooling system of claim 9, wherein the electrical machine has a seal and a leakage chamber which are disposed on the shaft such that the seal is able to prevent the coolant from flowing into the leakage chamber.

15. The cooling system of claim 14, wherein the leakage chamber is at least partially bounded by a radial surface of the shaft, said electrical machine comprising a slinger disk provided on the radial surface of the shaft.

16. The cooling system of claim 14, wherein the seal is disposed on the shaft to enable a fluid to act on a surface of the seal facing the fluid and reduces ingress of the residual leakage.

17. A vehicle, comprising an electrical machine mounted in or on the vehicle, the electrical machine including a stator, a rotor mounted for rotation about an axis of rotation and interacting magnetically with the stator during operation of the electrical machine, a shaft on which the rotor is fixed and which has an axial bore, and an inflow element sized to extend into the axial bore to enable a coolant to flow out of the inflow element and into the axial bore; a coolant circuit configured to transport the coolant through the axial bore; and a chamber disposed at an open end of the shaft, said chamber being delimited in an axial direction by an external axial boundary having one section extending transversely to the axis of rotation and disposed axially close to the shaft and another section also extending transversely to the axis of rotation but disposed axially distant from the shaft and enabling the coolant to be spirally guided around the axis of rotation into a coolant outlet.

\* \* \* \* \*